(12) United States Patent
Moran

(10) Patent No.: US 9,552,539 B2
(45) Date of Patent: Jan. 24, 2017

(54) SELECTIVELY ADDRESSING TRANSPONDERS

(75) Inventor: Humberto Moran, Milton Keynes (GB)

(73) Assignee: FRIENDLY TECHNOLOGIES LTD., Buckinghamshire (GB)

( * ) Notice: Subject to any disclaimer, the term of this patent is extended or adjusted under 35 U.S.C. 154(b) by 678 days.

(21) Appl. No.: 13/704,895

(22) PCT Filed: Jun. 9, 2011

(86) PCT No.: PCT/GB2011/051077
§ 371 (c)(1),
(2), (4) Date: Mar. 4, 2013

(87) PCT Pub. No.: WO2011/158017
PCT Pub. Date: Dec. 22, 2011

(65) Prior Publication Data
US 2013/0154799 A1    Jun. 20, 2013

(30) Foreign Application Priority Data
Jun. 18, 2010    (GB) .................................. 1010457.8

(51) Int. Cl.
*H04Q 5/22*     (2006.01)
*G06K 7/10*     (2006.01)
(Continued)

(52) U.S. Cl.
CPC ......... *G06K 19/0723* (2013.01); *G06K 7/0008* (2013.01); *G06K 7/10039* (2013.01)

(58) Field of Classification Search
CPC ................................. H04Q 5/55; H04Q 5/22
(Continued)

(56) References Cited

U.S. PATENT DOCUMENTS

| 3,713,148 A | 1/1973 | Cardullo et al. | |
| 5,500,651 A * | 3/1996 | Schuermann | ................... 342/42 |

(Continued)

FOREIGN PATENT DOCUMENTS

| EP | 0702324 A2 | 3/1996 |
| EP | 1093076 A1 | 4/2001 |

(Continued)

OTHER PUBLICATIONS

Bibliographic Data for document CN 101359361A, Yigang He et al, Data anticollision algorithm in RFID system, published Feb. 4, 2009 (2 pages).

(Continued)

*Primary Examiner* — Nam V Nguyen
(74) *Attorney, Agent, or Firm* — Ware, Fressola, Maguire & Barber LLP

(57) ABSTRACT

A method of selectively addressing one or more transponders in a set (17) of transponders ($2_1$, $2_2$, $2_3$, $2_4$, $2_5$) is described. The method comprise transmitting a first set of one or more commands (25; $25_1$, $25_2$) selected to be not executable by a first subset (24; $24_2$) of transponders or to be executable in a shorter time by the first subset of transponders than by a second subset of transponders (23; $23_1$, $23_2$) in the set, and transmitting a second set of one or more commands (26; $25_3$) such that the second set of commands are received by the transponders while the second subset of transponders are still executing the first set of commands.

17 Claims, 10 Drawing Sheets

(51) Int. Cl.
*G06K 7/00* (2006.01)
*H04Q 1/00* (2006.01)
*G06K 19/07* (2006.01)

(58) Field of Classification Search
USPC ...... 340/10.1–10.5, 5.29; 235/376, 385, 435, 235/436; 342/457, 44, 51; 455/404.2, 455/414.2
See application file for complete search history.

(56) References Cited

U.S. PATENT DOCUMENTS

| | | | |
|---|---|---|---|
| 5,550,547 | A | 8/1996 | Chan et al. |
| 5,673,037 | A * | 9/1997 | Cesar et al. ............... 340/10.32 |
| 5,883,582 | A | 3/1999 | Bowers et al. |
| 5,942,987 | A * | 8/1999 | Heinrich et al. ........... 340/10.42 |
| 6,431,449 | B1 * | 8/2002 | Reverdy ............. G06K 7/0008 235/462.25 |
| 6,763,996 | B2 * | 7/2004 | Rakers et al. ................. 235/375 |
| 7,889,058 | B2 * | 2/2011 | Suga et al. ................... 340/10.2 |
| 8,228,173 | B2 * | 7/2012 | Missimer et al. ........... 340/10.2 |
| 8,284,033 | B2 | 10/2012 | Moran |
| 8,717,145 | B2 * | 5/2014 | Ho et al. ...................... 340/10.1 |
| 8,981,909 | B2 * | 3/2015 | Turner ................ G06K 7/0008 340/10.32 |
| 2004/0140884 | A1 | 7/2004 | Gallagher, III et al. |
| 2005/0088286 | A1 | 4/2005 | Heinrich et al. |
| 2005/0231326 | A1 | 10/2005 | Enrico |
| 2007/0222608 | A1 * | 9/2007 | Maniwa ............. G06K 7/10316 340/572.7 |
| 2008/0018431 | A1 | 1/2008 | Turner et al. |
| 2008/0180220 | A1 | 7/2008 | Hollister et al. |
| 2010/0019883 | A1 | 1/2010 | Eom et al. |

FOREIGN PATENT DOCUMENTS

| | | |
|---|---|---|
| EP | 1172755 A1 | 1/2002 |
| GB | 2410867 A | 8/2005 |
| GB | 2437347 A | 10/2007 |
| WO | 0241650 A1 | 5/2002 |

OTHER PUBLICATIONS

Bibliographic Data for document CN 101256617A, Zhaoxi Ning et al, Multi-label anticollision algorithm in high-frequency RFID recognition system, published Sep. 3, 2008 (2 pages).
Bibliographic Data for document TW 399190B, Bowers et al, Anticollision protocol for reading multiple RFID tags, published Jul. 21, 2000 (1 page).
Korean Patent Abstracts, KR Publication No. 1020100011711 A, published Feb. 3, 2010, Sungkyunkwan University Foundation for Corporate Collaboration (1 page).
GB Search Report, Application No. 1010457.8 dated Oct. 15, 2010 (1 page).

* cited by examiner

SELECTIVELY ADDRESSING TRANSPONDERS

FIELD OF THE INVENTION

The present invention relates to a method of and apparatus for selectively addressing transponders particularly, but not exclusively, radio frequency identification (RFID) transponders.

BACKGROUND

Portable transponders (hereafter referred to simply as "transponders") such as radio frequency identification (RFID) transponders, usually comprise one or more semiconductor chips having logic and/or data handling capabilities, attached to one or more interface devices, such as an antenna. A transponder (which may also be referred to as a "tag") can communicate with external devices, such as interrogators and, via such interrogators, with supporting infrastructure, for example application middleware. Typically, a transponder can transmit or respond with one or more identities from a global numbering scheme. A transponder may also include memory for storing fixed or updatable data and/or sensors for detecting or measuring temperature, pressure etc.

Commonly, transponders are used to identify objects to which they are physically attached. Objects identified or tracked through transponders are hereafter called "tagged objects". Transponders on tagged objects can be used to determine the location of objects and/or monitor the environmental variables around such objects, for example temperature or pressure. Advanced transponders may incorporate actuators providing tagged objects with robotic or other capabilities.

Transponders communicate wirelessly with interrogators (also known as "readers" or "base stations") typically via radio waves. In some systems, the interrogation medium need not be electromagnetic, but can be optical and/or acoustic. The interrogation range varies from few millimeters to several meters depending on the type of transponder and reader, frequency, media, antenna, interference and other factors.

Interrogators can, in turn, be connected to a network of other interrogators and computers running appropriate supporting software. An RFID system typically includes at least one interrogator and at least one transponder.

Transponders may be passive, which means that they are energised through electric or electromagnetic induction by the interrogation signal of the interrogator, or active, which means that they are energised by an internal power source, such a battery. Passive transponders can only operate within the interrogation field of an interrogator. Arrival of a transponder in an interrogation field is usually referred to as "energising" the transponder. Passive transponders are described in U.S. Pat. No. 3,713,148 A.

The use of RFID systems is becoming widespread. For example, cheap transponders are used to identify pallets, cases and units of fast moving consumer goods (FMCGs). RFID systems are also employed to track assets in a variety of fields such as manufacturing, logistics and distribution, amusement, rental and leasing, and are used in factories to manage conveyor belts, in airports to track baggage, and in retail to track groceries. Leading manufacturers, distributors and retailers are promoting the usage of transponders to replace barcode-based product identification procedures and so improve the visibility of their stock and automate their operations. RFID is also an environmentally-friendly technology. For example, RFID tags can help improve management of supply chains of perishable goods and so reduce the amount of perishable goods thrown away as waste. RFID tags can also be used in recycling and the re-use of packaging. RFID tag can even be used to tag trees and help to prevent illegal logging.

To operate, RFID systems require transponders and interrogators to communicate. Communication takes place using standard frequencies, protocols, procedures and numbering schemas. Recent years have seen a variety of groups defining standards and regulating the use of RFID, including: International Organization for Standardization (ISO), International Electrotechnical Commission (IEC), ASTM International, DASH7 Alliance, and EPCglobal. Examples of standard wireless protocols for RFID systems are ISO 14443, ISO 15693, ISO/IEC 18000 Parts 2, 3, 4, 6, 6C and 7, ISO 18185 and EPC™ Gen2.

Usually, transponders and interrogators communicate in both directions and behave according to standard wireless communication protocols which, among other technical characteristics, specify: (a) a set of valid commands and parameters to be transmitted by an interrogator and (b) a set of responses and actions to those commands by transponders. Among other functions, interrogator commands and their respective transponder responses can allow interrogators to:

1. Individually identify transponders from an in-range population, a process usually referred to as "inventorying". Normally, commands used for inventorying do not address a specific transponder within the population, but a specific subset or the entire population. Commands aimed at more than one transponder are hereafter referred to as "collective commands".
2. Address specific transponders individually and so upload or download data to or from a specific transponder or change its security level. For this, existing protocols usually employ a temporary identification number (commonly and hereinafter referred to as a "handle"). Commands addressing a specific transponder are referred to as "individual commands" or (as used in some standard protocols) "access commands".

Usually, transponders work like a state machine, changing their operational status according to the commands received from the interrogator and as defined by their working protocol. For example, EPC Gen2 transponders have 7 general statuses, namely Ready, Arbitrate, Reply, Acknowledge, Open, Secure and Killed, and other status-defining features called session and select flags. Some statuses are used for inventorying (e.g. in EPC Gen2, Ready, Arbitrate, Reply and Acknowledge) and others for working with specific transponders using individual commands (e.g. in EPC Gen2, Open and Secure). In this example, the operational status of an EPC Gen2 transponder is defined by the combination of its general status, the value of all its inventory flags, and other status-defining features, for example the current inventory session.

Normally, all in-range transponders simultaneously listen to the interrogator. Transponders do not hear each other's responses and usually only the interrogator can hear transponder responses. Because of this, transponders cannot coordinate their responses so may reply simultaneously to collective commands, an undesired behaviour known as "collision". In conventional RFID systems, collision is unavoidable because the interrogator does not know the identities of newly-arriving transponders (hereinafter referred to as "unidentified transponders"), and therefore cannot address them individually. This limitation has been addressed in the past using an intelligent network which predicts the likely identity of incoming transponders per each interrogator and reference is made to GB 2 437 347 B. In other RFID systems, existing RFID protocols usually include anti-collision mechanisms involving selective addressing of transponder sub-populations or the use of randomly delayed responses, for example implementing a random number generator fed to a decreasing counter. Reference is made to CN 101359361 A, US 2008 180220 A, CN 101256617 A, US 2004 140884 A, WO 02 41650 A, TW 399190 B, KR 2010 0011711 A. Such mainstream standards as the ISO/IEC 18000-6C and EPC Gen2 define advanced anti-collision mechanisms and feature flags to differentiate identified from non-inventoried (unidentified) transponders, even providing for multiple sessions where various interrogators can independently inventory transponders within the intersection of their reading ranges. Furthermore, some standards also allow the selection of transponder population subsets through their data contents, including identities such as the standardised Electronic Product Code (EPC™), using "Select" commands, the nesting of which allows intersections and unions of matching or non-matching subsets.

However, research has shown that existing anti-collision mechanisms can suffer important performance limitations when dealing with large transponder populations, mostly due to the exponential degradation of these algorithms as transponder density increases. Example of such research is "Performance Benchmarks for Passive UHF RFID Tags" by K. M. Ramakrishnan and D. D. Deavours, Proceedings of the 13th GI/ITG Conference on Measurement, Modelling, and Evaluation of Computer and Communication Systems, Nuremberg, Germany, pp. 137-154 (2006). For instance, anti-collision mechanisms based on the selective addressing of transponders require interrogators to accurately estimate the number of in-range unidentified transponders, which is not always possible, and to issue a number of selecting commands the processing of which by transponders is slow, cumbersome and unreliable. Anti-collision mechanisms based on randomly delayed responses also require an accurate estimation of the in-range population, the size of which conditions the optimal spread of the random function.

Moreover, conventional anti-collision mechanisms perform particularly poorly when inventorying moving populations due to limitations as to the prioritisation of unidentified transponders. Unidentified transponders are all treated the same and therefore interrogators tend to miss transponders moving in or out of range while inventorying other segments of the population. This translates in a very poor tracking performance in applications where tagged objects move in last in, first out (LIFO) fashion (LIFO applications), for example as with the replenishment of shelves of fast-moving durable products.

The limitations of conventional RFID systems in dealing with large or moving populations are the consequence of mainstream protocols lacking collective commands that allow the prioritisation of transponders by functional criteria other than transponder identity or data, and inventory status. For example, conventional protocols offer no commands to address unidentified transponders by such other relevant functional criteria as energising time, arrival order, distance from the interrogator, or overall operational status. In high-performance applications, particularly those with high transponder density or mobility, or with LIFO mobility, it is desirable to have the facility to address finer subsets of an in-range population of transponders.

SUMMARY

According to a first aspect of the present invention there is provided a method of selectively addressing one or more transponders in a set of transponders, the method comprising transmitting a first set of one or more commands, the first set of commands selected to be not executable by a first subset of transponders or to be executable in a shorter time by the first subset of transponders than by a second subset of transponders in the set, and transmitting a second set of one or more commands for execution by the first subset of transponders such that the second set of commands is received by transponders while the second subset of transponders are still executing the first set of commands.

Thus, using "distraction", the first set of commands can be used to distract the second subset of transponders so that the second set of commands can be received and executed by the first subset (e.g. the target subset), but not the second subset.

The method may comprise identifying the first subset, and optionally the second subset, of transponders and selecting the first set of one or more commands so that transponders in the first subset finish execution of the first set of commands before transponders in the second subset finish execution of the first set of commands. The second subset may comprise the rest of the set of transponders. Selecting the first set of one or more commands may comprise choosing the commands in dependence upon status, property and/or characteristics which affects execution speed. For example, the first subset of transponders may share a common given status and the second subset of transponders may not share the status and transponders having the given status can execute a given command more quickly.

The method may comprise waiting a predetermined time between transmitting the first and second sets of commands. The method may comprise computing the time for transponders in the first subset to execute the first set of commands and, optionally, the time for transponders in the second subset to execute the first set of commands.

The method may further comprise transmitting a third set of one or more commands for execution by the second subset of transponders, such that the third set of commands is received by the transponders while the first set of transponders are still executing the second set of commands.

Thus, in cases where it is not possible or is difficult to find an initial set of commands which can be executed more quickly by the target subset of transponders, "inverted distraction" can be used to initially distract the second subset of transponders (which in this case is the target subset). Accordingly, the first set of commands can be used to initially distract the target subset and the second set of commands can used to distract the rest of the transponders sufficiently long for the target subset, but not the other transponders, to receive the third set of commands and start execution.

The method may further comprise transmitting timestamps at intervals for receipt and storage by transponders as they join the set of transponders, wherein the first set of one or more commands specify a range or list of timestamps selected such that the range or list excludes the first subset of transponders and so the first set of commands are not executable by the first subset of transponders.

The method may further comprise transmitting timestamps at intervals for receipt and storage by transponders as they join the set of transponders, wherein one or more commands specify a range or list of timestamps.

The first subset of transponders may comprise at least two transponders and the method may further comprise transmitting a fourth set of one or more commands, the fourth set of commands selected to be not executable by a first group of one or more transponders in the first subset of transponders or to be executable in a shorter time by the first group of transponders than by a second group of one or more transponders in the first subset, and transmitting a fifth set of one or more commands for execution by the first group of transponders such that the fifth set of commands is received by transponders while the second group of transponders are still executing the fourth set of commands.

The method may further comprise selecting suitable one or more commands from a plurality of commands based on statuses of the transponders.

The method may further comprise retrieving pre-selected suitable one or more commands.

The method may comprise transmitting the first set of commands at a first power level and transmitting the second set commands at a second, different power level, optionally, a higher power level. The method may comprise transmitting one or more further sets of commands (e.g. the third, fourth and/or fifth sets) at different power levels.

The transponders may be radio frequency identification (RFID) transponders. The transponders may be active or passive transponders. The transponders may conform to the EPC Global standard.

According to a second aspect of the present invention there is provided a method of selectively addressing one or more transponders in a set of transponders, the method comprising transmitting timestamps at intervals for receipt and storage by transponders as they join the set of transponders and transmitting a set of one or more commands for execution by a subset of transponders identified by a range or list of timestamps specified in the set of commands.

According to a third aspect of the present invention there is provided a computer program which, when executed by an interrogator device, causes the interrogator device to perform the method.

According to a fourth aspect of the present invention there is provided a computer readable medium storing the computer program. The computer readable medium may be a non-transitory computer readable medium.

According to a fifth aspect of the present invention there is provided apparatus for selectively addressing one or more transponders in a set of transponders, the apparatus comprising a controller and a transmitter, optionally a transceiver, wherein the apparatus is configured to perform the method.

According to a sixth aspect of the present invention there is provided apparatus for selectively addressing one or more transponders in a set of transponders, the apparatus comprising a controller and a transmitter, optionally a transceiver, wherein the apparatus is configured to transmit a first set of one or more commands, the first set of commands selected to be not executable by a first subset of transponders in the set or to be executable in a shorter time by the first subset of transponders than by a second subset of transponders in the set and to transmit a second set of one or more commands such that the second set of commands is received by transponders while the second subset of transponders are still executing the first set of commands.

According to a seventh aspect of the present invention there is provided a system comprising the apparatus and a set of transponders.

In certain embodiments of the present invention, a method allows the use of extended functional criteria in the prioritisation, segmentation and addressing of transponder population subsets of one or more in-range transponders, including unidentified ones. The method can be employed in order to:

Improve the performance of large inventories
Improve the efficiency of the wireless protocol
Enable reliable LIFO applications
Selectively manage the operational status of transponders The method exploits, in existing designs of RFID system, side effects associated with the execution of protocol commands by transponders to selectively and briefly distract subsets of the transponder population according to extended functional criteria, for example their operational status or distance from the interrogator antenna; and selectively address other population subsets. During a brief period of time, the distracted subset will ignore further interrogator commands that can therefore be aimed at the remaining population, for example to prepare them for inventorying using existing anti-collision mechanisms, the performance of which will be superior as fewer collisions occur because the distracted set would not participate in such inventory round. This can lead to improved performance, reliability and accuracy resulting from finer segmentation of the in-range population through extended functional criteria. However, for future designs of RFID systems, protocol extensions can be defined allowing selective addressing or distraction of population subsets by further functional criteria such as arrival time or order or user-defined segmentations.

BRIEF DESCRIPTION OF THE DRAWINGS

Embodiments of the present invention will now be described, by way of example, with reference to the accompanying drawings in which.

DETAILED DESCRIPTION OF CERTAIN EMBODIMENTS

Figure 1:
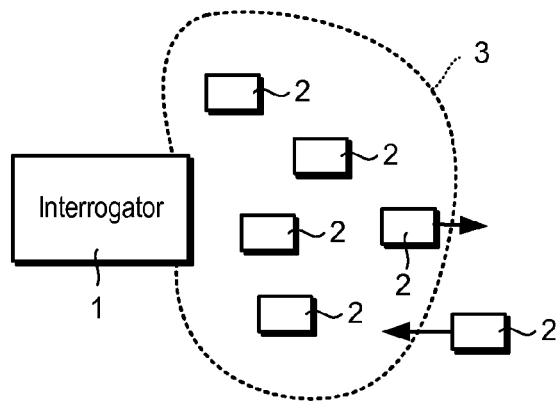
FIG. 1 is a schematic diagram of an interrogator/transponder system.

FIG. 1 is a simplified view of an interrogator/transponder system which comprises an interrogator 1 and a set of transponders 2. The transponders 2 can be attached to objects (not shown) to enable the system to track the objects. If a transponder 2 is located within an interrogation field or space 3 of the interrogator 1, then the interrogator 1 can communicate with the transponder 2. As shown in FIG. 1, transponders 2 can be mobile and so can enter, stay and leave the interrogation field 3.

Figure 2:
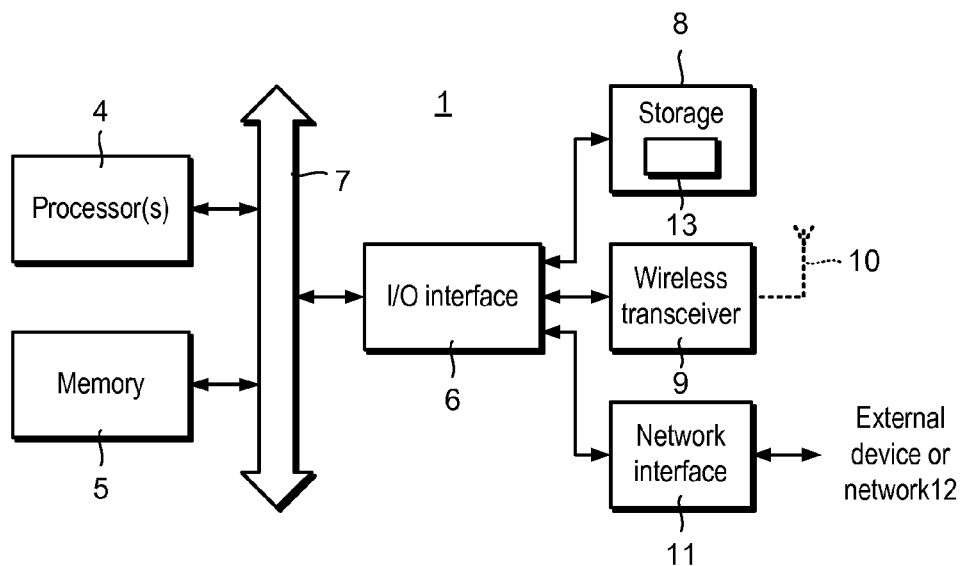
FIG. 2 is a schematic block diagram of the interrogator shown in FIG. 1.

Referring to FIG. 2, the interrogator 1 includes one or more processors 4, memory 5 and an input/output (I/O) interface 6 operatively connected by a bus 7. The I/O interface 6 is operatively connected to storage 8 (for example in the form of a hard disk drive or non-volatile memory), a wireless transceiver 9, in this case an RF transceiver 9 having an antenna 10, and a network interface 11 for communicating with an external devices or networks 12. Computer program code 13, which when executed causes the interrogator 1 to provide a distraction manager 18 (FIG. 5), is held in storage 8 and loaded into memory 5 for execution by the processor 4.

Figure 3:
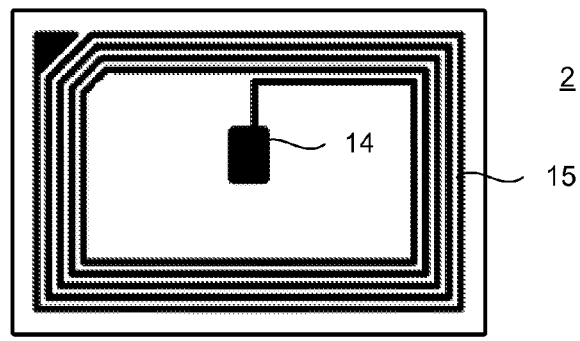
FIG. 3 is a schematic diagram of the transponder shown in FIG. 1.

Referring to FIG. 3, a transponder 2 includes an integrated circuit 14 connected to an antenna 15. Each transponder 2 may be assigned a unique identifier (UID) from a global numbering scheme, stored in the integrated circuit 14. In this example, the transponder 2 is a passive transponder. Examples of suitable integrated circuits are members of the NXP UCODE IC family and the Impinj 4QT family.

The interrogator 1 (FIG. 1) operates according to existing protocols, for example, EPC Gen2. However, in accordance with the present invention, its operation is modified to exploit side effects which are common to most RFID passive transponders and some active transponders, particularly those operating in the UHF spectrum and communicating with the interrogator 1 through backscattering.

Figure 4:
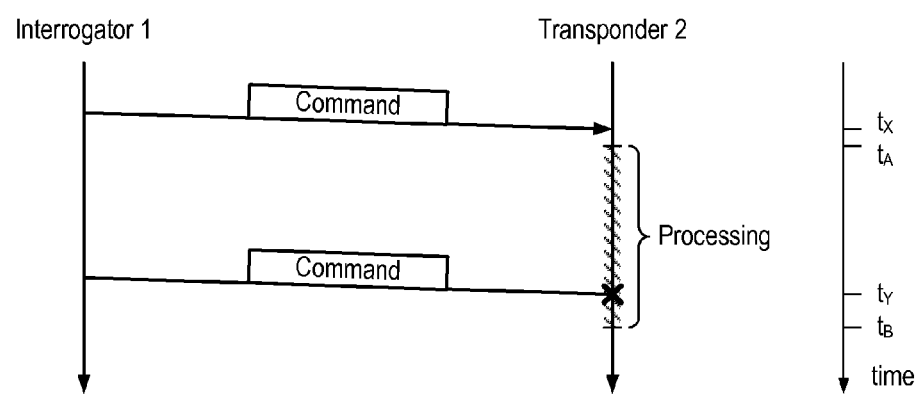
FIG. 4 illustrates a type of behaviour of a transponder.

Referring to FIG. 4, a first side effect or weakness which is exploited is that, while transponders 2 are executing a set (or sequence) of one or more commands, they usually ignore further incoming commands. This is because low-cost, low-power design of passive and some active transponders does not allow for the possibility of parallel processing. Thus, if a first command is received at a time $t_X$ and the transponder 2 processes the first command between times $t_A$ and $t_B$, where $t_X < t_A < t_B$, and a second command is received at time $t_Y$, where $t_A < t_Y < t_B$, then the transponder 2 will ignore (or "not notice"), i.e. miss or fail to receive or interpret, the second command. By design, transponders 2 also ignore "non-commands" (i.e. commands which fall outside a list of commands specified by a protocol). A non-command includes the trailing part of a valid command, the beginning of which is missed because of electromagnetic noise or due to the fact that the transponder is occupied executing an earlier-received command.

The response and behaviour of a transponder 2 upon receipt of a command depends on its current operational status. For instance, some otherwise valid commands are ignored in certain statuses. For example, an EPC Gen2 transponder 2 will only respond to inventory commands belonging to the inventory session it is currently participating in. Valid commands ignored by transponders because of their operational status are hereafter referred to as "sterile commands".

A second side effect relates to the time taken by transponders 2 to execute commands, which varies from command to command and with transponders' operational status. For example, a typical EPC Gen2 transponder takes about 250 µs to execute a QRYREP command for a non-current session and 1,050 µs for the current session. The processing time of commands that request backscattering of data (e.g. READ) may be significantly longer and may also increase in proportion to the volume of the backscattered data.

A third side effect relates to the possibility of overlapping backscattered replies from one or more transponders 2 with further interrogator commands aimed at other transponders, hereafter referred to as "shouting over". This is possible because of the significant difference in strength between backscattered and interrogator signals.

These side effects and design characteristics are exploited to transmit a set of one or more distracting commands targeting a subset of transponders (hereafter called a "distracted subset") and, while these transponders are distracted executing such commands, transmit a subsequent set of commands (herein referred to as "target commands") targeting another subset of transponders (hereafter called a "target subset"). This method is referred to as "selective distraction".

Selective distraction allows the execution of collective commands over a target subset of selectively addressed transponders which do not even need to be identified, authenticated or inventoried. This opens up many new possibilities for dealing with large, mobile or heterogeneous transponder populations, such as distracting a large subset of unidentified transponders while inventorying the remaining ones. To illustrate this, a particularly interesting application using EPC Gen2 involves distraction of all transponders in Arbitrate status (e.g. currently participating in an inventory round) so newly incoming transponders in Ready status can be inventoried before earlier arrivals (in other words, "jump the queue"), therefore enabling LIFO applications.

Whilst selective distraction described herein exploits side effects and design characteristics of existing RFID systems, it can be applied to future RFID protocols which might incorporate explicit instructions for the selective addressing or distraction of transponders in a subset of the in-range population. A future implementation might provide for the segmentation of transponders by groups through group-assignment commands and the implementation of purposely-designed commands addressing specific groups or instructing them to suspend execution of further incoming commands for a determined period of time, being the target groups and distraction time parameters of such commands.

Another possible extension of an RFID protocol which could support selective distraction might involve assignment of timestamps to transponders through periodic transmission of commands broadcasting an increasing or decreasing counter, where incoming transponders register the first value received after energising and so enable their segmentation by arrival time or order. Such segmentation is implemented through purposely-designed addressing or distraction commands, whose parameters are the target time or counter ranges and the desired distraction period.

The methods of selective distraction or addressing by groups or timestamps can be combined with segmentation commands in conventional anti-collision mechanisms and so increase the granularity of the distracted or target subsets. For example, the EPC Gen2 command "Select" could be used to segregate a subset according to specific functional data (e.g. the price of the tagged object), initiate a conventional inventory so these transponders are set to Arbitrate status, and distract them plus all previously inventoried transponders to perform a fast inventory of the freshly incoming transponders. An application of such an approach is a security door that gives priority to the detection of moving, expensive products over non-expensive or stationary ones.

Distraction commands are chosen according to the statuses of the in-range transponders, especially those in the distracted and target subsets. Specifically, distraction commands are chosen according to sterility and execution-time considerations, so:

1. They are sterile, so they do not create undesired effects, for example change the status of transponders in the distracted or target subsets.
2. If a sterile command is not possible (e.g. because there are no sterile commands available), other commands are chosen so long as the affected transponders later end up in an acceptable operational status so the overall functionality of the RFID system is not affected.
3. Their transmission and execution time is as fast as possible in order to optimise the use of the wireless link.
4. Their execution by transponders in the distracted subset takes longer than that by transponders in the target subset, allowing opportunistic and timely insertion of subsequent commands within the window created by the time difference.

Figure 5A:
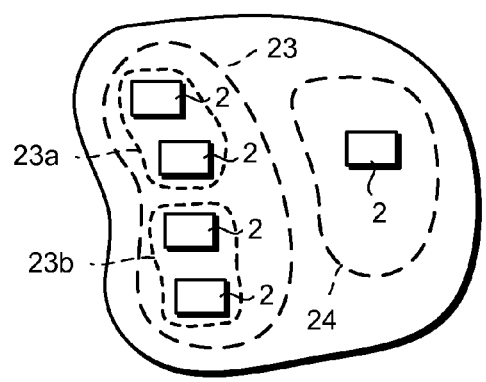
FIG. 5a illustrates a population of transponders which includes a target subset and distracted subset, the distracted subset being further divided into groups of transponders.
Figure 5:
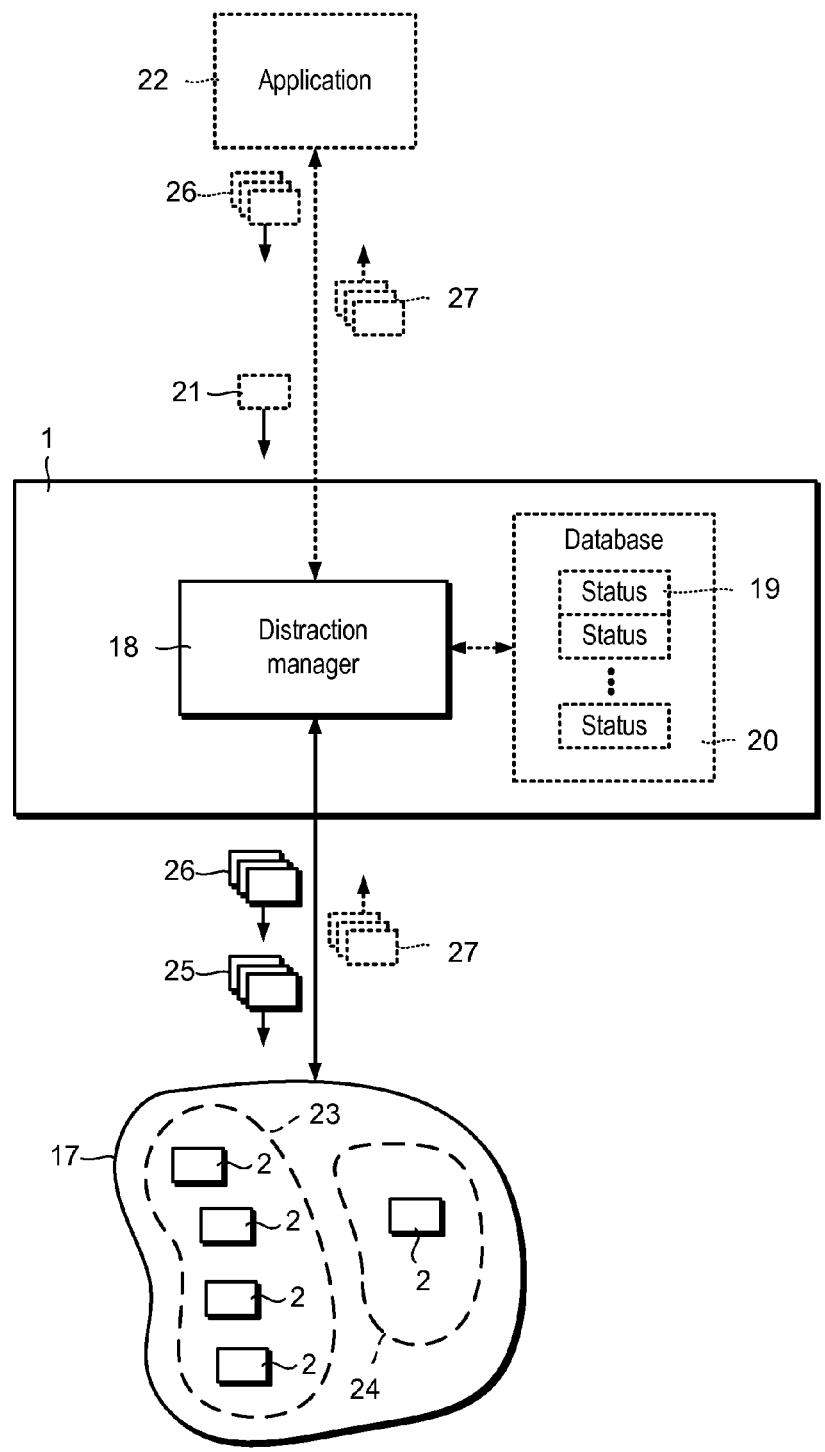
FIG. 5 is a schematic block diagram of an application, a distraction manager and a population of transponders which includes a target subset and distracted subset.

Referring to FIG. 5, selective distraction within a set or population 17 of transponders 2 is implemented using a process 18 in the interrogator 1 (hereinafter referred to as a "distraction manager") which keeps track of statuses 19 of in-range transponders 2 according to all previously transmitted commands and received responses, either at individual level or by groups (e.g. status of all unidentified transponders), also including a record of the transmitted timestamps, if applicable. This can be done in an in-memory structure such as an array, table or list, or in a database 20 which can be located in the interrogator 1 itself or elsewhere in the network and which can be centralised or distributed. The interrogator 1 uses this information to dynamically choose those distraction commands that segment the transponder population according to the desired functional characteristics. As will be explained later, in some embodiments, the database 20 and/or application 22 may be omitted.

Figure 6:
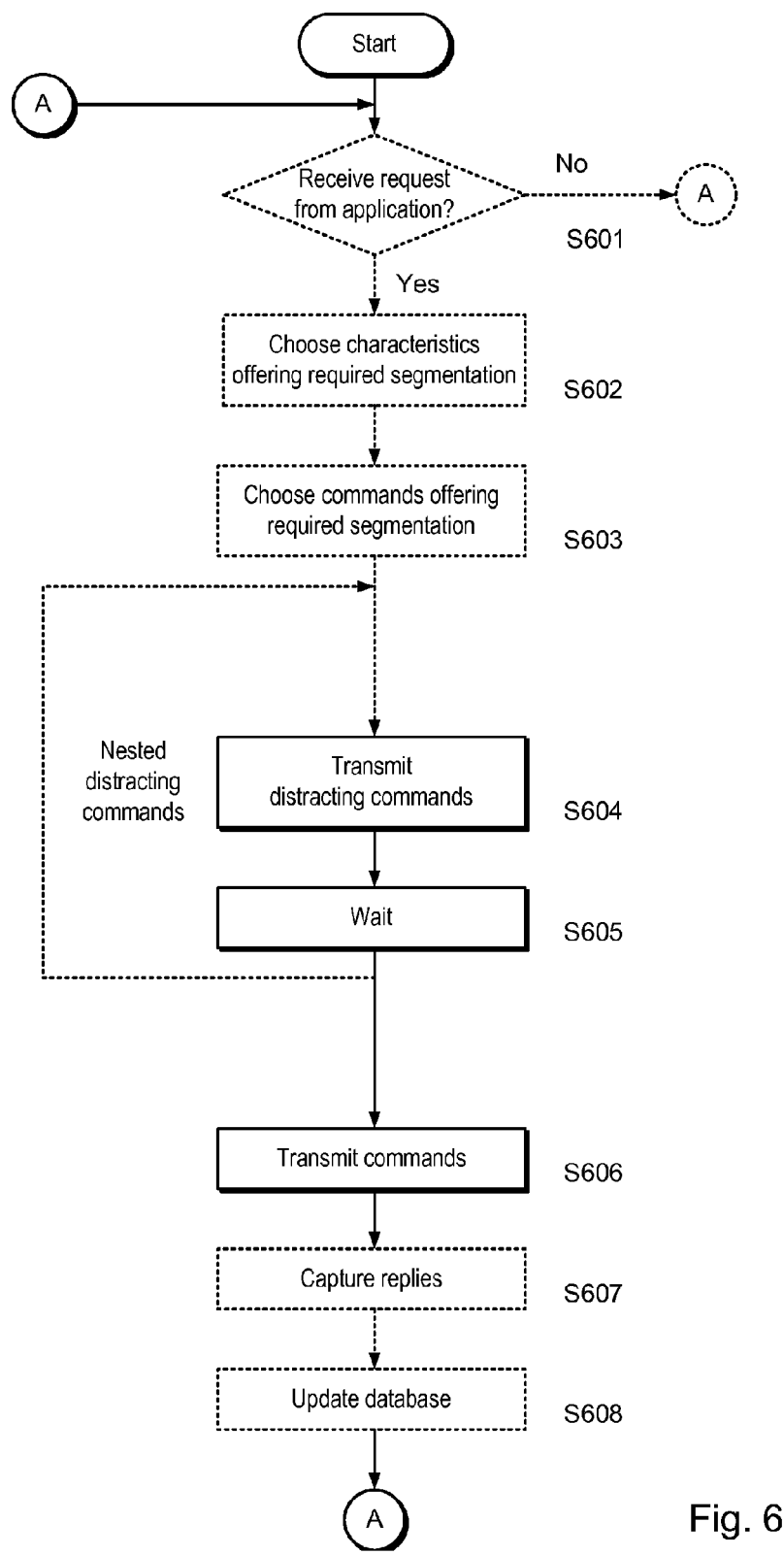
FIG. 6 is a process flow diagram of a method carried out by an interrogator.

Referring also to FIG. 6, after receiving a request 21 to address a subset of the population 17 with target commands 26 as instructed by an application 22 (step S601) or according to predefined ("hardwired") instructions, the distraction manager 18 can:

1. Optionally consult the database 20 to choose the characteristics offering the required segmentation, specifically dividing the population in distracted and the target subsets 23, 24 (step S602).
2. If applicable, according to the considerations listed hereinbefore (e.g. sterility and execution time), evaluate all applicable sets of distracting commands segmenting by the chosen characteristics and chose those commands 25 sets whose execution time is longer in the distracted subset 23 than in the target subset 24 (step S603).
3. Transmit the set of distracting commands 25, nesting further sets of distracting commands if necessary (step S604).
4. Wait until the set of distracting commands 25 is executed in transponders in the target subset (step S605).
5. Transmit the set of target commands 26 while transponders in the distracted subset are still busy executing the distracting commands (step S606).
6. Optionally capture any backscattered reply 27 from transponders 2 in the target subset 24 and send it to the application 22 (step S607). If more than one transponder 2 in the target subset 24 reply simultaneously, then the interrogator 1 may not be able to interpret some of all of the replies due to collisions.
7. Optionally update the database 20 with the resulting status of all affected transponders (step S608).

Figure 7:
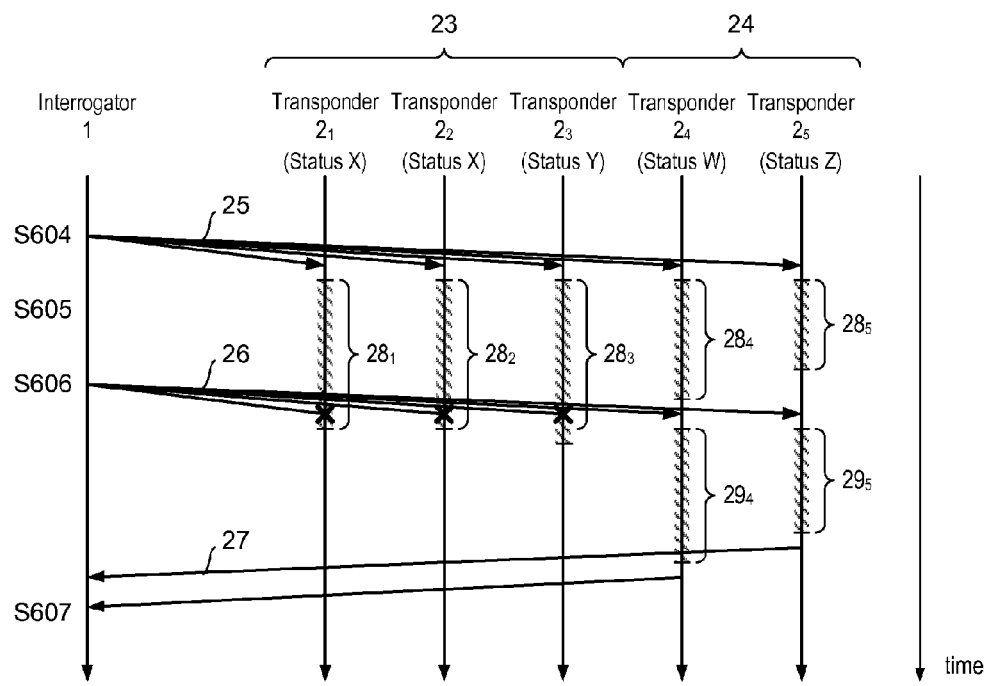
FIG. 7 illustrates interaction of an interrogator and a set of five transponders in a first embodiment.
Figure 8:
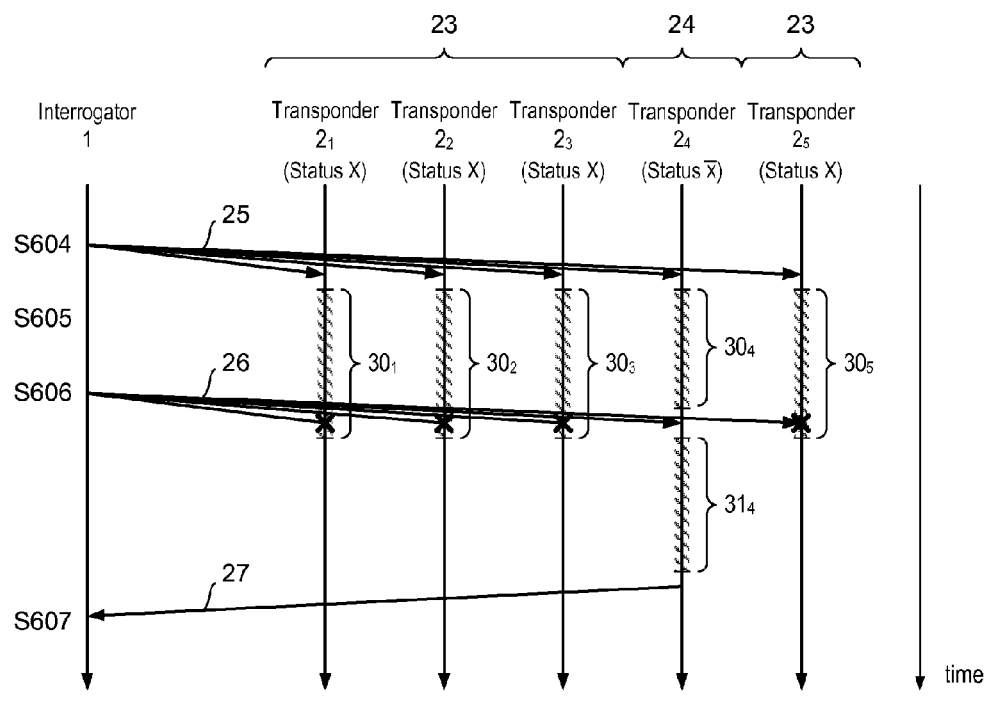
FIG. 8 illustrates interaction of an interrogator and a set of five transponders in a second embodiment.
Figure 9:
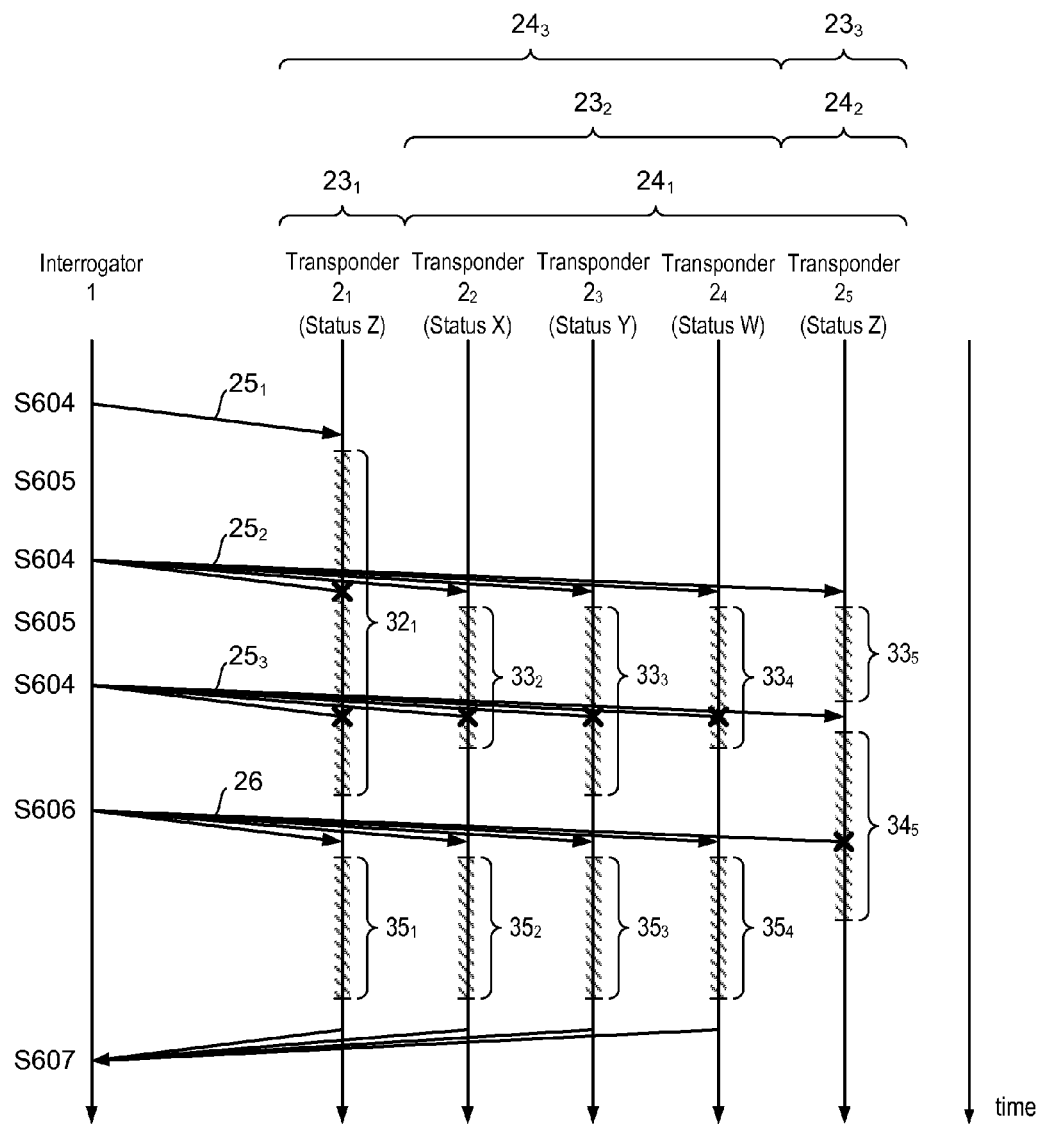
FIG. 9 illustrates interaction of an interrogator and a set of five transponders in a third embodiment.

FIG. 7 illustrates the use of selective distraction in a system comprising interrogator 1 and a population of five in-range transponders $2_1$, $2_2$, $2_3$, $2_4$, $2_5$.

Referring to FIGS. 2, 5, 6 and 7, at the beginning of a cycle, the interrogator 1 receives an instruction 21 from an external application 22 through its network interface 11 (step S601). The instruction 21 requests the execution of a set of target commands 26 that should not be executed by first, second and third transponders $2_1$, $2_2$, $2_3$, but should be executed by fourth and fifth transponders $2_4$, $2_5$. The distraction manager 18 consults the database 20 for the status 19 of each transponder $2_1$, $2_2$, $2_3$, $2_4$, $2_5$ and determines which set of one or more distracting commands 25 is appropriate to segment the in-range population into a distracted subset 23 comprising the first, second and third transponders $2_1$, $2_2$, $2_3$ having, for example, statuses "X", "X" and "Y" respectively, and a target subset 24 comprising the fourth and fifth transponders $2_4$, $2_5$ having, for example, statuses "W" and "Z" respectively (step S602). The distraction manager 18 chooses the most efficient set of distracting commands according to sterility and execution-time considerations (step S603). In this example, only one distracting command 25 is used. The distraction manager 18 transmits, via the wireless transceiver 9, the chosen distracting command 25 as a wireless signal (step S604). If more than one distracting command 25 is used, then they can be transmitted sequentially. Upon receipt, all five transponders $2_1$, $2_2$, $2_3$, $2_4$, $2_5$ immediately start executing the distracting command 25 as respective processes or threads $28_1$, $28_2$, $28_3$, $28_4$, $28_5$. Execution of the distraction command 25 takes longer in the first, second and third transponders $2_1$, $2_2$, $2_3$ than in the fourth and fifth transponders $2_4$, $2_5$ because the distraction manager 18 purposely chose the distracting command 25 so it allowed the time segmentation of the in-range population according to the instruction. The distraction manager 18 waits until the distracting command 25 is executed in the target subset 24 (step S605). The expected duration needed to execute the distracting command 25 (or, if there is more than one, distracting commands) is read from the database 20 or is computed based upon the statuses 19 read from the database 20. Of the transponders 2 in the target subset 24, the fourth transponder $2_4$ having status "W" is expected to take the longest (but still takes a shorter time than the members of the distracted subset 23). The distraction manager 18 then transmits one or more target commands 26 intended for the target subset 24 as a wireless signal. In this example, only one target command 26 is transmitted. Upon receipt, the fourth and fifth transponders $2_4$, $2_5$ start executing the target command 26 as respective processes or threads $29_4$, $29_5$. The target command 26 is ignored by first, second and third transponders $2_1$, $2_2$, $2_3$ because these transponders $2_1$, $2_2$, $2_3$ are still executing the distraction command 25 running as threads $28_1$, $28_2$, $28_3$. Optionally, the interrogator 1 can capture any reply or replies 27 backscattered by the fourth transponders $2_4$ and/or the fifth transponder $2_5$ in the target subset 24, send the reply or replies 27 to the application 22, and update the database 20 with the new transponder statuses 19 if, according to the protocol, the distracting command 25 was not sterile or the target command 26 is expected to change the status of the target transponders $2_4$, $2_5$. The process starts again when a new instruction 21 arrives.

In a second embodiment of the invention, the distraction manager 18 is arranged to systematically transmit one or more predetermined or "hardwired" distracting commands 25 without keeping record of the statuses of transponders 2 or dynamically evaluating and deciding on the distracting commands 25. Thus, the database 20 can be omitted. One or more target commands 26 can also be "hardwired" or received from the application 22 as instruction 21 as described in the first embodiment. In the second embodiment, the interrogator 1 transmits one or more predetermined distracting commands 25 (step S604), waits a predetermined period of time (step S605) and then transmits one or more target commands 26 (step S606) aimed at the transponders 2 in a target subset 24 while the distracted subset 23 is still executing the distracting command(s) 25. This embodiment is useful when the segmentation criteria do not depend on the application, for example for the segregation of colliding transponders.

Referring to FIGS. 2, 5, 6 and 8, operation of the system in the second embodiment will now be described. In this example, the application 22 does not provide the distraction command or commands 25 or target command or commands 26. In this example, the status of each of the first, second, third and fifth transponders $2_1$, $2_2$, $2_3$, $2_5$ is "X" and the status of the fourth transponder $2_4$ is different, namely "$\overline{X}$" (i.e. NOT X).

At the beginning of the cycle, the distraction manager 18 broadcasts a predetermined distracting command 25 in a way similar to that hereinbefore described (step S604). Upon receipt, the transponders $2_1$, $2_2$, $2_3$, $2_4$, $2_5$ start executing the distracting command 25 as respective threads $30_1$, $30_2$, $30_3$, $30_4$, $30_5$. The fourth transponder $2_4$, in this case the only one in the target subset 24, also executes the distraction command 25 yet, because of its current operational status ("$\overline{X}$"), execution terminates sooner. The distraction manager 18 waits a predetermined time until the transponders with status other than "X" finish execution of the distracting command 25 (step S605). The distraction manager 18 then transmits a target command 26 (step S606). Only those transponders not currently executing a distraction command 25 listen to and execute the target command 26. In this example, the fourth transponder $2_4$ is the only one which receives and executes the subsequent command 26. Optionally, the distraction manager 18 may listen out for and capture any potential reply 27 by transponders in the target subset 24, in this case in the form of a backscattered reply (step S607). The process reaches its end and either repeats or branches to other interrogator activities as defined in the standard protocol.

In a third embodiment of the invention, selective distraction can be used in a nested fashion to distract two or more subsets 23a, 23b (FIG. 5a) of transponders in different statuses and so increase segmentation granularity. In other words, the interrogator 1 can sequentially and rapidly send many sets of one or more distracting commands, the effect of which is to distract many subsets so the remaining transponders can be addressed separately using one or more target commands. This is particularly useful when managing exceptions where relatively few transponders share statuses with either the distracted subset or the target subset. The distraction of such transponders may be achieved through individual commands where the interrogator 1 address and individual transponder by means of its handle, for example, requesting it to backscatter a sufficiently long stream of data. This distraction can then be nested with further distractions aimed at other transponders using the shouting over technique. Moreover, to maximise the choice of distracting commands, for example using those where the execution time in the distracted subset is faster than that in the target subset, selective distraction may be used in a negative or "inverted" way, where the target subset 24 is first distracted, the remaining population 23 is then distracted and, once the target subset 24 comes out of its distraction and while the remaining population is still distracted, the target subset 24 is addressed with the target commands. Inverted distraction can be combined with normal or "positive" distraction and nested distraction to distract any nested combination of target subsets, then distract the remaining population or any nested combination of subsets, and then send a set of commands aimed at the combination of target subsets while the remaining population or its nested combination is distracted.

Referring to FIGS. 2, 5, 6 and 9, operation of the system in a third embodiment will now be described. In this example, the first transponder $2_1$ is identified and can be addressed through individual commands using its handle. The remaining transponders $2_2$, $2_3$, $2_4$, $2_5$ are unidentified. In this example, the first, second, third, fourth and fifth transponders $2_1$, $2_2$, $2_3$, $2_4$, $2_5$ start with status "Z", "X", "Y", "W" and "Z" respectively.

At the beginning of the cycle, the interrogator 1 receives an instruction 21 from the external application 22 through its network interface 11 (step S601). The instruction 21 requests the execution of a set of target commands 26, in this case only one command that should not be executed by unidentified transponders in status "Z", in this example the fifth transponder $2_5$. The distraction manager 18 consults the database 20 for the status 19 of each transponder $2_1$, $2_2$, $2_3$, $2_4$, $2_5$ and determines which sets of distracting commands and nesting and negation steps are appropriate to segment the in-range population into a first distracted subset $23_1$ consisting of the fifth transponder $2_5$ which is in status "Z" and a first target subset $24_1$ consisting of the first, second, third and fourth transponders $2_1$, $2_2$, $2_3$, $2_4$ lying in statuses "Z", "X", "Y" and "W" respectively (step S602). The distraction manager 18 determines that the first transponder $2_1$ in status "Z" is identified so it belongs to the first target subset $24_1$ and can be distracted using individual commands. It also determines that aiming a distraction command at transponders in status "Z" does not provide the required segregation granularity and so nesting and negation are required.

The distraction manager 18 chooses the most efficient set of distracting commands and distracted subsets according to the sterility and execution-time considerations (step S603). In this case, a first set of distraction commands comprises only one command, although more than one command can be used. Using the wireless transceiver 9, the distraction manager 18 transmits a first distraction command $25_1$ aimed at the first transponder $2_1$ individually addressing the first transponder $2_1$ by its handle. The command requires the first transponder $2_1$ to backscatter a specific volume of data (not shown). Transmission of the backscatter reply (not shown) keeps the first transponder $2_1$ distracted for a period of time while it executes thread $32_1$.

While the first transponder $2_1$ is backscattering the requested data, the distraction manager 18 shouts over the backscattered signal by transmitting a second distraction command $25_2$ aimed at the second distracted subset $23_2$ and selected to be executed more quickly by any transponders with status "Z", in this example the fifth transponder $2_5$, (step S604). Again, a second set of distraction commands comprises only one command, but more than one command can be used. The second, third, fourth and fifth transponders $2_2, 2_3, 2_4, 2_5$ execute the second distracting command $25_2$ as threads $33_2, 33_3, 33_4, 33_5$ respectively.

The distraction manager 18 waits for execution of the second distraction command $25_2$ to finish by transponders with status "Z" (step S605) and transmits a third distraction command $25_3$ (step S604), which is aimed at the remaining transponders or unidentified transponders in status "Z", in this case the third distracted subset $23_3$. Instead of just one distraction command, more than one command can be used. The first transponder $2_1$ ignores the third distraction command $25_3$ because it is still distracted, busy backscattering data (not shown). The second, third and fourth transponders $2_2, 2_3, 2_4$ will also ignore the third distraction command $25_3$ because they too are distracted, busy executing the second distraction set $25_2$. The fifth transponder $2_5$ executes the third distraction command $25_3$ as thread $34_5$.

The distraction manager 18 waits a period of time, calculated on the expected duration of all distraction commands per applicable transponder status as reported by database 20, to allow the transponders in the first and second distracted subsets $23_1, 23_2$, namely first, second, third and fourth transponders $2_1, 2_2, 2_3, 2_4$, to finish the execution of the first and second distracting commands $25_1, 25_2$ (step S605).

The distraction manager 18 transmits a target command 26, which is executed by first, second, third and fourth transponders $2_1, 2_2, 2_3, 2_4$ as threads (step S606). A target command set comprising more than one target command 26 can be used. Optionally, the distraction manager 18 can listen for and capture replies 27 backscattered by the transponders $2_1, 2_2, 2_3, 2_4$ in the target subset $24_3$ (step S607), send the replies 27 to the application 22, and updates the database 20 with the new transponder statuses if, according to the protocol, any of the distracting commands $25_1, 25_2, 25_3$ transmitted were not sterile or the target commands 26 are expected to change the status of the target transponders (step S608). The process can start again when a new instruction 21 arrives.

In a fourth embodiment of the invention, the interrogator 1 changes transmission power between a set of one or more distraction commands 25 and a set of one or more target commands 26, thereby distracting transponders within shorter range so a subset of more distant transponders can be addressed separately by the second set of commands. After distracting the nearest transponders, the interrogator can then target timely a second set of commands to the remaining transponders or to those subsets which transponders come out from their distraction period. A possible application for this distraction by range is an interrogator that can be used to separately monitor and discriminate tagged objects sitting on a shelf (short range) from those moving nearby (long range). Another possible application is the detection of arriving or leaving transponders by distracting nearby ones using a low power signal to then increase the power and detect and identify farther ones. This strategy is not limited to just two power levels and can be applied to several levels where transmission power is changed repeatedly and followed by as many distraction commands as allowed by the power granularity of the interrogator and the distraction period provided by these commands, in a nested and/or inverted fashion as described in the third embodiment.

Figure 10:
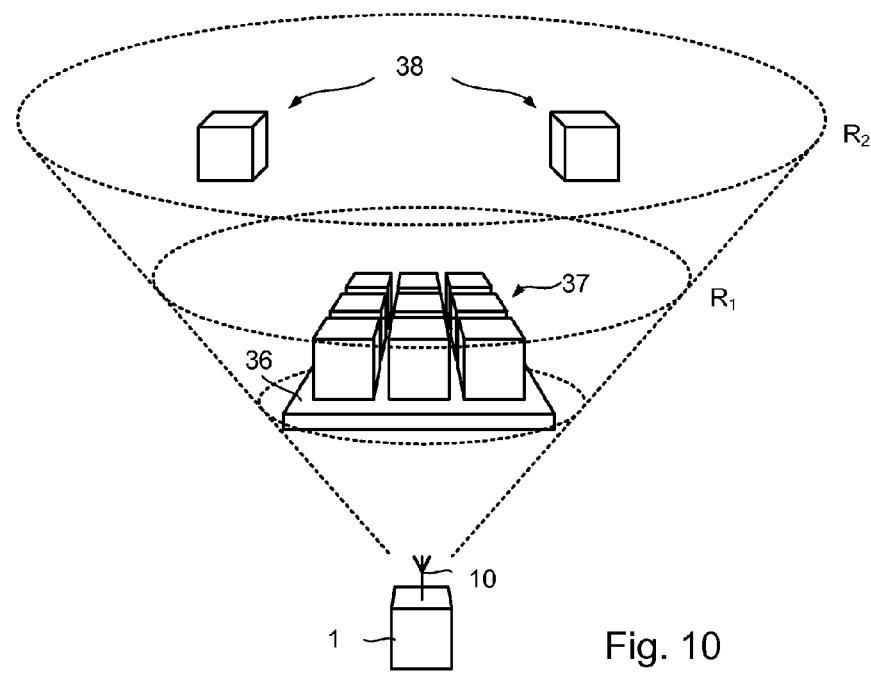
FIG. 10 is schematic diagram of smart shelving.
Figure 12:
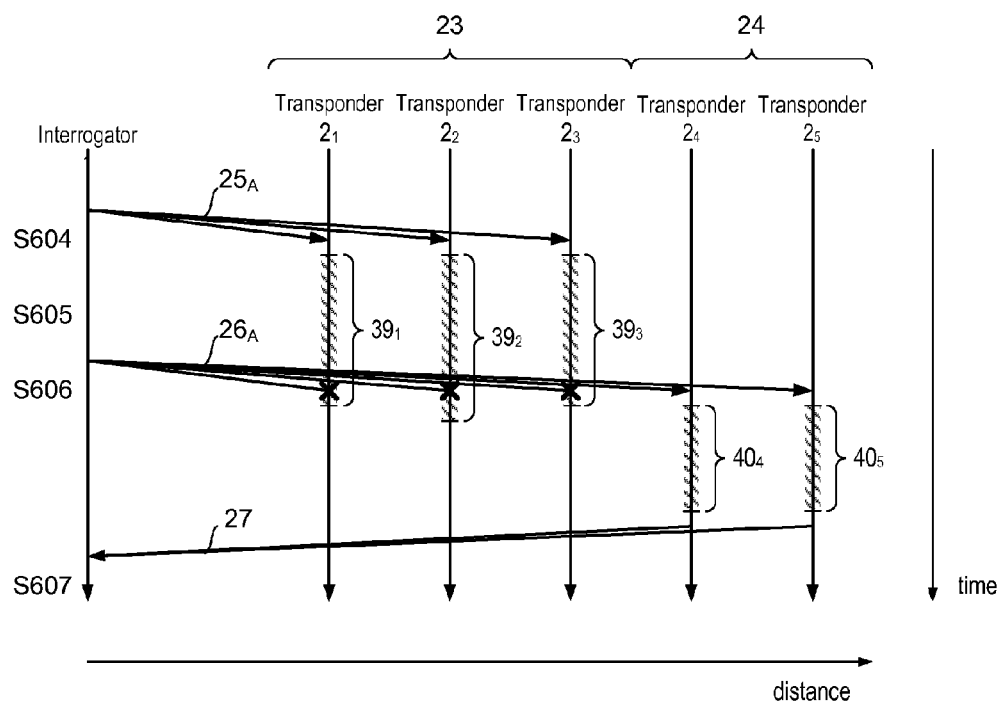
FIG. 12 illustrates interaction of an interrogator and a set of five transponders in a fourth embodiment.
Figure 11:
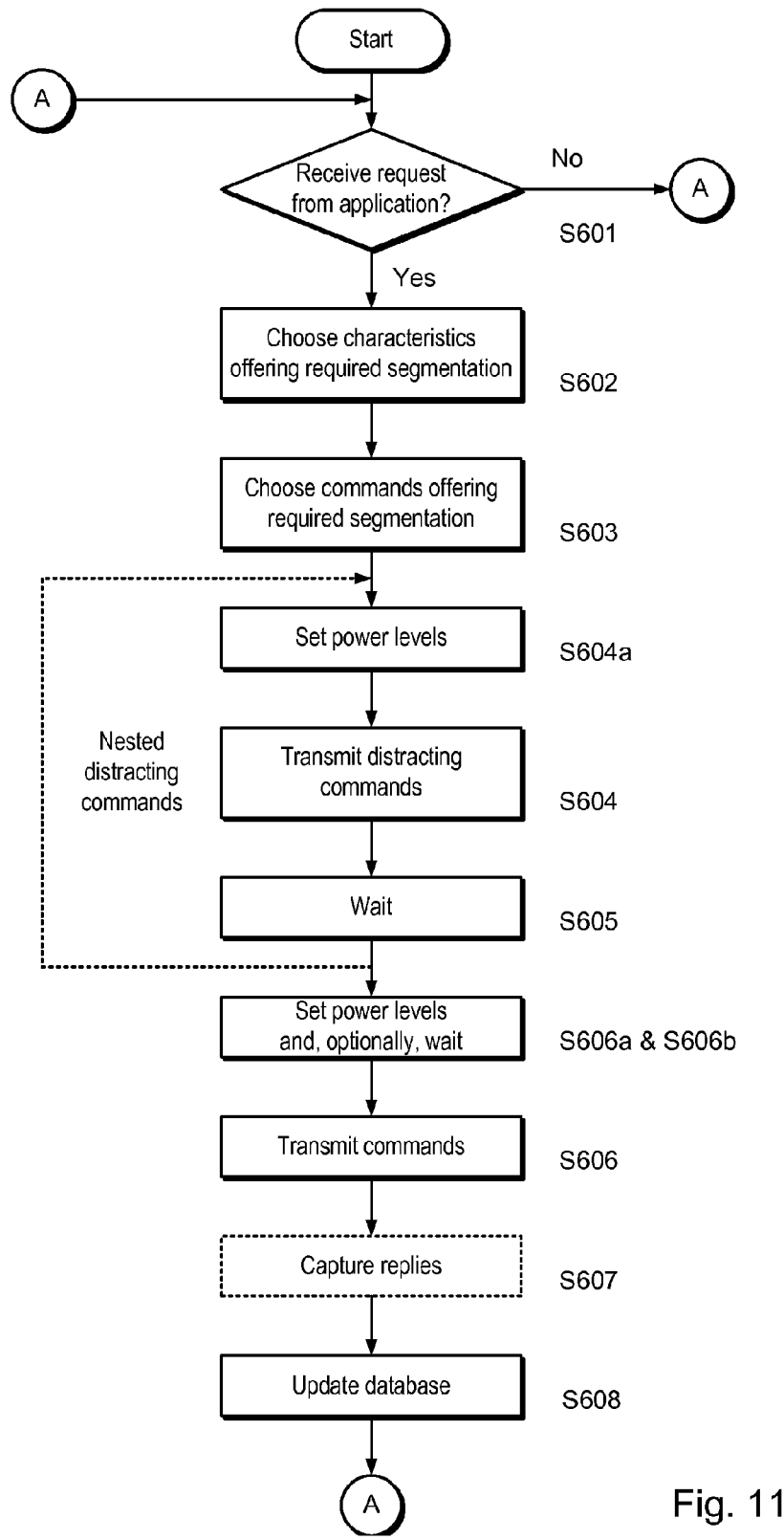
FIG. 11 is a process flow diagram of a method carried out by an interrogator.
Figure 13:
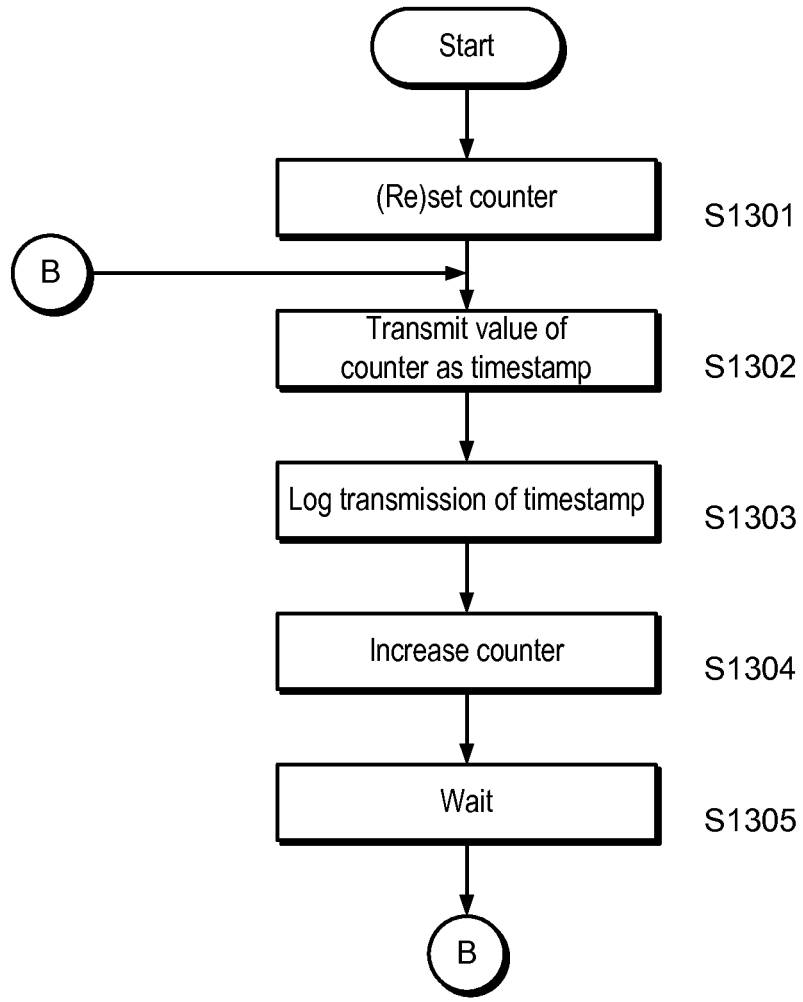
FIG. 13 is a process flow diagram of a method of transmitting timestamps.
Figure 14:
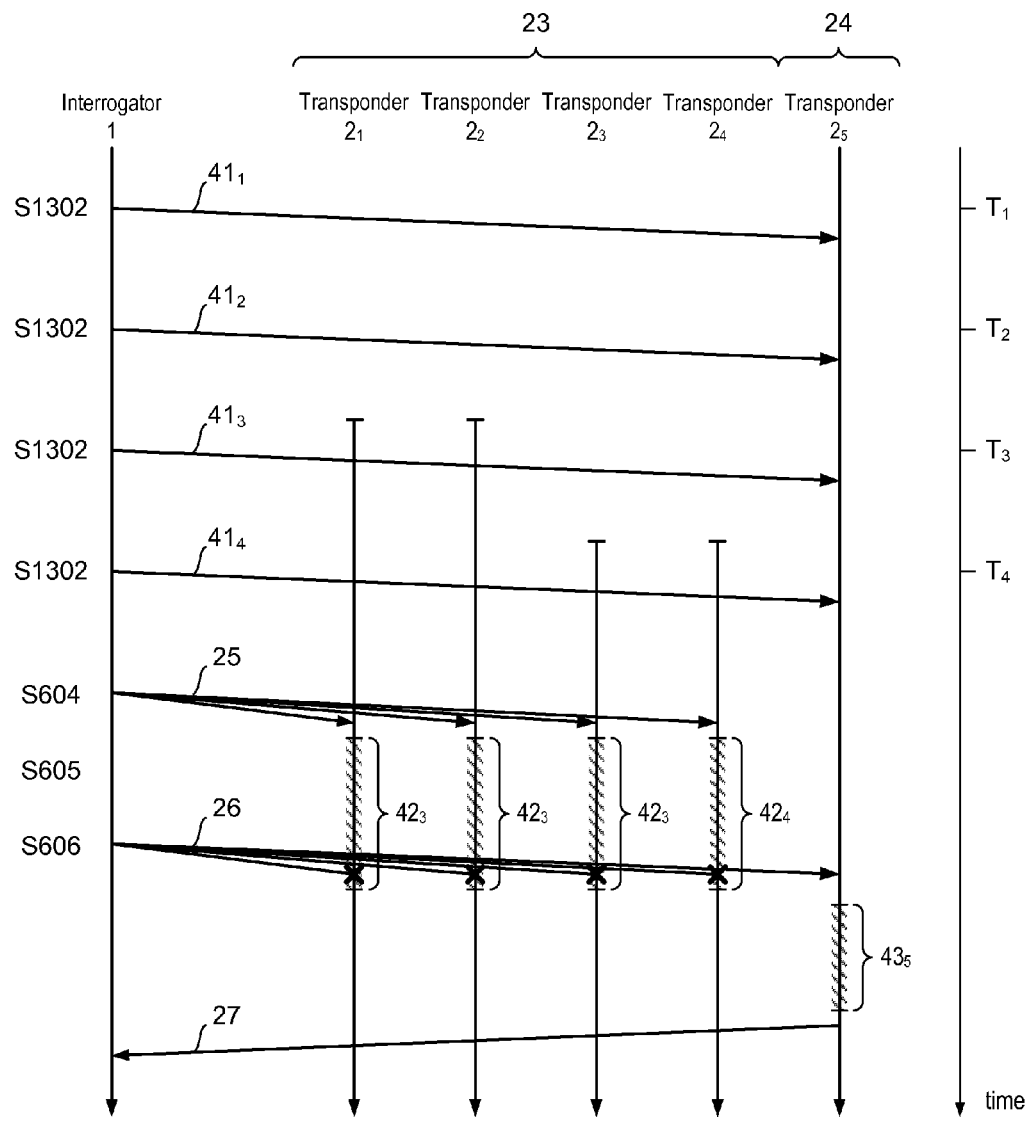
FIG. 14 illustrates interaction of an interrogator and a set of five transponders in a fifth embodiment.

FIG. 10 illustrates a shelf 36 where selective distraction through altering power levels can be used to enable the detection of moving tagged objects, either arriving or departing from the shelf 36. The "smart" shelf 36 and an interrogator 1 are spaced apart in such a way that the interrogator 1 is able to detect tagged objects 37 placed on the shelf 36 and other tagged objects 38 which are further away. Using a low-power signal, the interrogator 1 uses, for example, antenna 10 to transmit a distraction command 25 solely addressing transponders 2 within a short range $R_1$. This command will only affect transponders attached to objects sitting on or very close to the shelf 36, in this case tagged objects 37, and will keep these transponders distracted for a brief period of time during which the interrogator 1 increases the signal power to cover a longer range $R_2$ and so transmits a command aimed at farther transponders, in the example those of tagged objects 38 which are not sitting on the shelf because, for example, are being currently held by a shopper or employee, or have been misplaced.

Referring to FIGS. 2, 5, 6, 10, 11 and 12, operation of the system employing a distraction method using different transmission power levels of will now be described.

At the beginning of the cycle, the interrogator 1 receives an instruction 21 from an external application 22 through its network interface 11 (step S601). The instruction 21 requests execution of a set of target commands 26 to be executed solely by transponders located in within an outermost region, e.g. 40%, of the interrogation range, i.e. the maximum range. In this case, the set of target commands 26 comprises only one command. The distraction manager 18 calculates a level of power necessary to reach only the innermost region, in this case 60%, of the interrogation range, adjusts the power of the interrogator accordingly, and consults the status of in-range transponders in database 20 for the applicable distraction commands (steps S602). The distraction manager 18 decides on the most efficient set of distracting commands according to the sterility and execution-time considerations (step S603). In this example, only one distraction command is chosen. Through the wireless transceiver, the distraction manager 18 sets the chosen power level (step S604a), optionally waits for new in-range transponders to energise (step S604b) and transmits the distraction command 25 at the chosen, relatively low power level (step S604). The closest transponders, in this case first, second and third transponders $2_1, 2_2, 2_3$, execute the distraction command 25 as threads $39_1, 39_2, 39_3$ respectively. Due to the low power of the signal, the farther transponders, in this case fourth and fifth transponders $2_4, 2_5$, do not receive the transaction command 25. The distraction manager 18 readjusts the interrogator power to a level which covers 100% of the interrogation range (step S606a) and, optionally, waits for the new in-range transponders 38 to energize (step S606b). The distraction manager 18 then transmits the target command 26 as a wireless signal which reaches all in-range transponders $2_1, 2_2, 2_3, 2_4, 2_5$ yet which is ignored by the distracted subset 23 comprising the first, second and third transponders $2_1, 2_2, 2_3$ because they are busy executing threads $39_1, 39_2, 39_3$ (step S606). Since the signal comprising the target commands 26 is transmitted at a power which is sufficient to reach the entirety of the interrogation range, it triggers the execution of the target commands 26 in the target subset 24 comprising fourth and fifth transponders $2_4, 2_5$ as threads $40_4, 40_5$. Optionally, the distraction manager 18 can capture a reply 27 backscattered by a transponder $2_4$, $2_5$ in the target subset (step S607), forward the reply 27 to the application 22, and update the database 20 with the new transponder statuses if, according to the protocol, the distracting commands 25 were not sterile or the transponder commands 26 are expected to change the status of the target transponders (step S608). The process reaches its end and starts again when a new instruction 21 arrives.

In a fifth embodiment of the invention, the interrogator 1 transmits timestamps to be registered by transponders 2 as they are energised when they enter the interrogator range 3 (FIG. 1) and then directly addresses or distracts selected subsets of transponders by time of arrival by specifying a list or range of timestamps.

A recently-energised transponder 2 will store a timestamp received after energising and keep the timestamp until it is de-energised. This allows the interrogator 1 to specify a range of timestamp values or a specific timestamp value in a command. This can be used in a distracting command. For example, if a transponder receives a command specifying a timestamp which does not match its stored timestamp, then the transponder can ignore the command. Otherwise, if the timestamps match, the transponder can execute the command.

Referring to FIGS. 2, 5, 6, 13 and 14, operation of the system in a fifth embodiment will now be described. In this example, a fifth transponder $2_5$ arrives first, then first and second transponders $2_1$, $2_2$ arrive and then third and fourth transponders $2_3$, $2_4$ arrive.

The distraction manager 18 regularly broadcast timestamps 41 (steps S1301 to S1305). In this example, the distraction manager 18 transmits first, second, third and fourth timestamps $41_1$, $41_2$, $41_3$, $41_4$ at times $T_1$, $T_2$, $T_3$ and $T_4$ respectively as the wireless signals.

After time $T_4$, the distraction manager 18 receives an instruction 21 from the application 22 through the network interface 11 requesting transmission of a target command 26 solely to transponders that have arrived earlier than 3 units of time before, in this case the fifth transponder $2_5$ only, which arrived before $T_1$ (steps S601 to S603) Accordingly, the distraction manager 18 sends a distracting command 25 as a wireless signal aimed at those transponders with timestamp later than $T_1$, namely first, second, third and fourth transponders $2_1$, $2_2$, $2_3$, $2_4$ (step S604) This triggers execution of the distracting command 25 as threads $42_1$, $42_2$, $42_3$, $42_4$. The distraction manager 18 transmits the target command 26 as a wireless signal while the first, second, third and fourth transponders $2_1$, $2_2$, $2_3$, $2_4$ are distracted, so only the fifth transponder $2_5$ executes the commands 26 as thread $43_5$ (step S606). Optionally, the distraction manager 18 captures replies 27 backscattered by a transponder in the target subset 24 and forwards them to the application 22 (step S607). The process reaches its end and proceeds to transmit further timestamps to mark incoming transponders until a new instruction 21 arrives.

It will be appreciated that many modifications may be made to the embodiments hereinbefore described. For instance, more than one interrogator can be used for example one to distract the distracted subset and another to transmit target commands. Fewer or more transponders can be used. The transponders need not be passive, but can be active transponders. In-range transponders need not be similar or operate under the same protocol, for example to use selective distraction to combine two or more protocols without creating side effects produced by the misinterpretation of commands by transponders operating under different protocols, therefore enabling co-existence of heterogeneous transponders and interrogators. The interrogators and transponders need not communicate through RF portion of the spectrum, but can communicate at other frequencies, e.g. LF, optical etc.

Features of different embodiments can be combined in further embodiments. For example, the system and process can be modified to combine the use of changes in transmission power for the segmentation of the population as described in the fourth embodiment with the hardwiring of distraction commands as described in the second embodiment. The system and process can be modified to employ the creation of hardwired distraction commands with power-driven ones and nested with negated arrival-time ones.

The invention claimed is:

1. A method of selectively addressing one or more transponders in a set of transponders, the method comprising:
   selecting a first command, such that the first command is not executable by a first subset of transponders or is executable in a shorter time by the first subset of transponders than by a second subset of transponders in the set;
   transmitting the first command to the transponders; and
   transmitting a second command to the transponders at a predetermined time for execution by the first subset of transponders, the predetermined time selected such that the second command is received by the set of transponders while the second subset of transponders is still executing the first command.

2. A method according to claim 1, wherein the method further comprises:
   transmitting a third command for execution by the second subset of transponders, such that the third command is received by the transponders while the first set of transponders are still executing the second command.

3. A method according to claim 2, wherein the first subset of transponders comprises at least two transponders and the method further comprises:
   transmitting a fourth command, the fourth command selected to be not executable by a first group of one or more transponders in the first subset of transponders or to be executable in a shorter time by the first group of transponders than by a second group of one or more transponders in the first subset; and
   transmitting a fifth command for execution by the first group of transponders such that the fifth command is received by transponders while the second group of transponders are still executing the fourth command.

4. A method according to claim 1, the method further comprising:
   transmitting timestamps at intervals for receipt and storage by transponders as they join the set of transponders;
   wherein one or more commands specify a range or list of timestamps.

5. A method according to claim 1, the method further comprising:
   transmitting timestamps at intervals for receipt and storage by transponders as they join the set of transponders;
   wherein the first command specifies a range or list of timestamps selected such that the range or list excludes the first subset of transponders and so the first command is not executable by the first subset of transponders.

6. A method according to claim 1, the method further comprising:
   transmitting timestamps at intervals for receipt and storage by transponders as they join the set of transponders;

wherein the second or subsequent specifies a range or list of timestamps selected such that the range or list excludes a subset of transponders and so the commands are not executable by the subset of transponders.

7. A method according to claim 1, the method further comprising:
selecting suitable one or more commands from a plurality of commands based on statuses of the transponders.

8. A method according to claim 1, the method further comprising:
retrieving pre-selected suitable one or more commands.

9. A method according to claim 1, comprising:
transmitting the first command at a first power level; and
transmitting the second command at a second, different power level, optionally, a higher power level.

10. A method according to claim 1, further comprising:
transmitting one or more further commands at different power levels.

11. A method according to claim 1, wherein the transponders are radio frequency identification (RFID) transponders.

12. A method according to claim 1, wherein the transponders are passive transponders.

13. A method according to claim 1, wherein the transponders conform to the Electronic Product Code Global standard.

14. A non-transitory tangible computer readable medium encoded with a computer program which, when executed by an interrogator device, causes the interrogator device to perform a method according to claim 1.

15. Apparatus for selectively addressing one or more transponders in a set of transponders, the apparatus comprising:
a controller; and
a transmitter, optionally a transceiver;
wherein the apparatus is configured to perform a method according to claim 1.

16. Apparatus for selectively addressing one or more transponders in a set of transponders, the apparatus comprising:
a controller; and
a transmitter, optionally a transceiver;
wherein the apparatus is configured to transmit a first command, the first command selected, based on statuses of the transponders, to be not executable by a first subset of transponders in the set or to be executable in a shorter time by the first subset of transponders than by a second subset of transponders in the set, and to transmit a second command to the transponders at a predetermined time for execution by the first subset of transponders, the predetermined time selected such that the second command is received by the set of transponders while the second subset of transponders are still executing the first command.

17. A system comprising:
apparatus for selectively addressing one or more transponders in a set of transponders, the apparatus comprising:
controller; and
a transmitter, optionally a transceiver;
wherein the apparatus is configured to perform a method according to claim 1; and
a set of transponders.

* * * * *